United States Patent
Ly

(10) Patent No.: US 6,411,309 B1
(45) Date of Patent: *Jun. 25, 2002

(54) KERBEROS INTERFACE ENABLING MENU-ASSISTED RESOURCE CONTROL PROGRAM TO RECOGNIZE KERBEROS COMMANDS

(75) Inventor: Tania Trinh Ly, Irvine, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/273,048

(22) Filed: Mar. 19, 1999

(51) Int. Cl.[7] .................................................. G06F 3/14
(52) U.S. Cl. ..................... 345/733; 345/810; 709/100; 709/201; 709/203; 709/206; 713/201
(58) Field of Search ................................. 345/969, 970, 345/339, 329, 335; 713/201, 150; 709/100, 201, 203, 206

(56) References Cited

U.S. PATENT DOCUMENTS

| | | | | |
|---|---|---|---|---|
| 6,003,136 A | * | 12/1999 | Schanze | 713/201 |
| 6,009,175 A | * | 12/1999 | Schanze | 380/23 |
| 6,055,639 A | * | 4/2000 | Schanze | 713/201 |
| 6,175,920 B1 | * | 1/2001 | Schanze | 713/150 |

OTHER PUBLICATIONS

Doug Engert, Unix Kerberos Commands, Jan. 22, 1997.*

* cited by examiner

Primary Examiner—Raymond J. Bayerl
Assistant Examiner—Thomas T. Nguyen
(74) Attorney, Agent, or Firm—Alfred W. Kozak; Mark T. Starr; Lise A. Rode

(57) ABSTRACT

A system and method is provided whereby a Client-User may communicate with a specialized client server and a Kerberos server. The client-server provides a specialized Menu-Assisted Resource Control Program (MARC) which enables client requests to use the Menu-Assisted Resource Control Program to access a Kerberos Support Library via a directive interface. The Menu-Assisted Resource Control Program has a Directive Interface which holds a Kerberos Entry Point, which communicates to a Kerberos Support Library which also has a Kerberos Directive Interface having its own Entry Point (KEP) which Entry Point is common to both the MARC and the Kerberos Directive Interface. The Menu-Assisted Resource Control Program can now link to the Kerberos Support Library to find a response to any particular Kerberos command utilized by the Client-User and then can relay back the response to the Menu-Assisted Resource Control Program which enables it to respond back to the Client User. Thus, Users of the client server can now utilize the functionality of the Kerberos commands in a seamless fashion.

9 Claims, 10 Drawing Sheets

MARC DIRECTIVE INTERFACE

1. DECLARE KERBEROS SUPPORT LIBRARY
   EXAMPLE:
   LIBRARY KRBSUPPORTLIB(
   (LIBACCESS-BYFUNCTION,FUNCTIONAME=
   "KRBSUPPORTLIB");
2. ESTABLISH A LINKAGE TO THE KERBEROS SUPPORT LIBRARY,
3. IF LINKAGE IS SUCCESSFUL,CALL THE FOLLOWING ENTRY POINT.
4. IF LINKAGE FAILS,GENERATE AN ERROR MESSAGE TO THE USER.

KSL ENTRY POINT

SAMPLE CODE:

```
INTEGER PROCEDURE HANDLE_KRB_DIRECTIVES(
        (COMS_HEADER            % CONTAINS THE COMS
                                  HEADER
        ,COMMAND                % CONTAINS THE KERBEROS
                                  COMMAND MINUS KRB
        ,TAG                    % CONTAINS SECURITY AND
                                  LANGUAGE INFORMATION
        ,DIRECTIVE              % CONTAINS THE
                                  DIRECTIVE KEYWORD KRB
        ,GET_DIALOG_ATTRIBUTE   % FUNCTION TO INQUIRE
                                  CALLER ATTRIBUTES
        ,RESPONSE_FORMATTER     % FUNCTION TO RETURN
                                  RESPONSE TO CALLER
        ,SCRATCH                % SCRATCH ARRAY
        );
REAL ARRAY
        COMS_HEADER(*)
        ,COMMAND(*)
        ,TAG(*)
        ,DIRECTIVE(*)
INTEGER PROCEDURE GET_DIALOG_ATTRIBUTE
(ATTNO,ATT);
        VALUE           ATTNO;
        INTEGER         ATTNO;
        REAL ARRAY      ATT(*);
        FORMAL;
INTEGER PROCEDURE RESPONSE_FORMATTER
(TEXT_LENGTH,TEXT);
        VALUE           TEXT_LENGTH;
        INTEGER         TEXT_LENGTH;
        EBCDIC ARRAY    TEXT(*);
        FORMAL;
EBCDIC ARRAY            SCRATCH(*);
LIBRARY KRBSUPPORTLIB;
```

FIG. 5

CLEARPATH SEVER

```
                    KERBEROS DIRECTIVE INTERFACE
                              KSL ENTRY POINT
         THE ENTRY POINT IN THE KERBEROS DIRECTIVE
         INTERFACE
         SAMPLE CODE:
         INTEGER PROCEDURE HANDLE_KRB_DIRECTIVES(
               (COMS_HEADER           % CONTAINS THE COMS
                                        HEADER
                ,COMMAND              % CONTAINS THE KERBEROS
                                        COMMAND MINUS KRB
                ,TAG                  % CONTAINS SECURITY AND
                                        LANGUAGE INFORMATION
                ,DIRECTIVE            % CONTAINS THE
                                        DIRECTIVE KEYWORD KRB
                ,GET_DIALOG_ATTRIBUTE % FUNCTION TO INQUIRE
                                        CALLER ATTRIBUTES
                ,RESPONSE_FORMATTER   % FUNCTION TO RETURN
                                        RESPONSE TO CALLER
                ,SCRATCH              % SCRATCH ARRAY
                );
         REAL ARRAY
               COMS_HEADER(*)
               ,COMMAND(*)
               ,TAG(*)
               ,DIRECTIVE(*)
         INTEGER PROCEDURE GET_DIALOG_ATTRIBUTE
         (ATTNO,ATT);
               VALUE        ATTNO;
               INTEGER      ATTNO;
               REAL ARRAY   ATT(*);
               FORMAL;
         INTEGER PROCEDURE RESPONSE_FORMATTER
         (TEXT_LENGTH,TEXT);
               VALUE        TEXT_LENGTH;
               INTEGER      TEXT_LENGTH;
               EBCDIC ARRAY TEXT(*);
               FORMAL;
         EBCDIC ARRAY       SCRATCH(*);

1. BUILD THE REQUEST COMING FROM MARC.
         2. PROCESS THE KEBEROS SERVICE REQUEST.
         3. IF THERE IS NO ERROR PROCESSING A REQUEST, SEND
            A RESPONSE BACK TO MARC TO BE DISPLAYED TO THE
            USER.
         4. IF THERE IS NO ERROR PROCESSING A REQUEST,
            GENERATE AN ERROR MESSAGE AND ROUTE IT BACK
            TO BE DISPLAYED TO THE USER.
                              CLEARPATH SEVER
```

FIG.6

KERBEROS INTERFACE ENABLING MENU-ASSISTED RESOURCE CONTROL PROGRAM TO RECOGNIZE KERBEROS COMMANDS

CROSS REFERENCES TO RELATED APPLICATIONS

This application is related to co-pending application U.S. Ser. No. 09/148,644 entitled "Kerberos Command Structure and Method for Enabling Specialized Kerberos Service Requests" filed Sep. 4, 1998 and incorporated herein by reference.

This application is further related to several other co-pending applications as indicated below and which also incorporated by reference:

U.S. Ser. No. 09/026,746, which issued as U.S. Pat. No. 6,175,920 entitled "Expedited Message Control for Synchronous Response in a Kerberos Domain"

U.S. Ser. No. 09/948,840, which issued as U.S. Pat. No. 6,055,639 entitled "Synchronous Message Control System in a Kerberos Domain."

FIELD OF THE INVENTION

This disclosure is related to methods of enabling a User to make Kerberos service requests from a Menu-Resource Control Program which through a back-end interface, enables a Menu-Assisted Resource Control program to recognize Kerberos commands and to respond back to a User.

BACKGROUND OF THE INVENTION

In present day networks and computer systems, the need for privacy and proper authentication of the network and computer Users is one of the foremost areas of concern. The Kerberos security system is generally used today as a developing standard for authenticating network Users, and is often used in the UNIX community and in the Unisys ClearPath systems where it is useful because it functions in a multi-vendor network and does not require the transmission of passwords over the network.

Kerberos operates to authenticate Users, that is to say, it determines if a User is a valid User. It does not provide other security services such as audit trails. Kerberos authentication is based on "passwords" and does not involve physical location or smart cards.

In order to implement Kerberos in a system, each computer in a network must run the Kerberos software. Kerberos works by granting a "ticket", which ticket is honored by all of the network computers that are running the Kerberos protocol. The tickets are encrypted, so that passwords never go over the network in "clear text" and the Users do not need to enter their password when accessing a different computer.

Since there is often a need to run Kerberos on every single computer in a network, this sometimes presents a problem for potential Users. Considerable effort and time may be involved in porting Kerberos to each different hardware platform in the network. Kerberos users tended generally, to be large networks which were furnished with extended expertise. Since such resources were not generally available to smaller networks, it was sometimes a problem to make it available to smaller networks, which normally could not justify the cost and expense.

Kerberos networks are involved with the type of systems designated as "symmetric crypto-systems". One type of symmetric crypto-system is called the "Kerberos Authentication System". This type of system was discussed and published on the Internet by J. T. Kohl and D. C. Neuman in an article entitled "The Kerberos Network Authentication Service", which was published in September 1993 on the Internet RFC 1510.

Kerberos uses symmetric key crypto-systems as a primitive and often uses the Data Encryption Standard (DES) as an inter-operability standard. Kerberos systems have been adopted as the basis for security service by the Open Software Foundations (OSF), and Distributed Computing Environment (DCE). Thus, Kerberos was designed to provide authentication and key-exchange, but were not particularly designed to provide digital signatures.

Thus, networks require systems and methods for securing communications which provide for one User to authenticate itself to another User, and additionally, this often required systems for securing communications which facilitated digital signatures being placed on a message, in order to provide for non-repudiation.

Kerberized environments involve the transmittal of messages, for example, from a server to a client, which leads to several major problems in these networks. These problems involve the situation of how to perform any number of useful functions in the Kerberos environment which may require unusual and flexible types of command structures.

The present disclosure involves the provision of a new User Interface on a Unisys ClearPath NX Server which then permits the User to perform many selectable Kerberos functions. The present system takes advantage of a previously developed Menu-Assisted Resource Control program (MARC) and provides a specialized interface which enables Users to enter Kerberos commands, not only on the MARC command line but also on various menus and forms in addition. Further it allows the implementation of Kerberos functionality in a Kerberos Support Library without the requirement for making any major changes to the Menu-Assisted Resource Control program while still providing Users with the Menu-Assisted Resource Control program as a standard Unisys interface in a server such as a Unisys ClearPath NX Server. The newly supplied Kerberos Interface provided herein enables the Menu-Assisted Resource Control program to recognized as being a Kerberos command and then to initiate the Kerberos Support Library to provide the Kerberos functionality.

As was indicated in the co-pending companion case, U.S. Ser. No. 09/148,644 entitled "Kerberos Command Structure and Method for Enabling Specialized Kerberos Service Requests," there was provided a series of specialized commands useful for Kerberos functionality. Now it is necessary to make the functionality of these Kerberos commands available to the User in a seamless fashion. Now since there was an existing User Interface on the ClearPath server which was called the Menu-Assisted Resource Control program (MARC), it was desirable to make the Kerberos functionality available to the Users of this program in a seamless fashion. Thus now, a User can simply make a Kerberos Service Request through the existing User Interface designated Menu-Assisted Resource Control program. This task was accomplished by taking advantage of the special feature which already existed in the Menu-Assisted Resource Control program called a Directive Interface. As a result of this, the Kerberos command functionality now has the same "look and feel" as all other functions which were already existing in the Menu-Assisted Resource Control program. Thus, this enables a uniform type of request across the board whether it is a Kerberos request or some other request. Advantageously over the former traditional use of the Directive Interface, it is now possible that Users can enter the new functional Kerberos commands via menus and forms in a fashion which could not be done with the traditional Directive Interface.

The present method and system describes what is designated as a "back end interface" which is normally not visible to the User but provides the functionality of enabling the User to send a Kerberos Service Request via MARC to the Kerberos Support Library (KSL) and then receive a return response from the Kerberos support Library via MARC to the User which is displayed in a seamless fashion.

SUMMARY OF THE INVENTION

A Kerberos Domain is provided whereby a client-User may communicate with a specialized client-server and a Kerberos-server. The client-server (ClearPath server) provides a Menu-Assisted Resource Control program (MARC) which enables client requests to access a Kerberos Support Library via a Directive Interface. The client-server has a Universal Data Port which communicates with a Kerberos server. The Kerberos server has a Key Distribution Center (RDC), a Kerberos Administration File (K-ADMIN) and a Kerberos data base which provides information and data to the client-server also designated as a ClearPath server.

The client-server (ClearPath server) provides a connection via a network cloud to a User-client and to the Kerberos server. The client-server is provided with a Universal Data Port (UDP) which connects to the Kerberos server. The client-server also has a User Interface which connects to a Kerberos Support Library (KSL) which includes a Directive Interface which processes the Kerberos commands coming from the Menu-Assisted Resource Control program.

The Kerberos Support Library connects to the Master Control Program, the User Interface, and the Universal Data Port on the one hand while also connecting to an encryption Library, a User Data Module and General Security Service Application Program Interface Support Library (GSSAPI).

The Menu-Assisted Resource Control program is provided with a MARC Directive Interface which holds a Kerberos Entry Point (KEP). Likewise, the Kerberos Support Library is provided with a Kerberos Directive Interface which has its own Kerberos Entry Point (KEP). These two entry points are duplicates of each other in terms of software applicability so that the MARC program can now link to the Kerberos Support Library to find a response to the Kerberos command which can then relay back to MARC for response back to the User.

As a result, the User who already has a Menu-Assisted Resource Control program may now, via the Kerberos Interface, use and access Kerberos commands through the Menu-Assisted Resource Control program, which utilizes the Kerberos Support Library to generate a response back to MARC who can then reply to the User.

BRIEF DESCRIPTION OF THE DRAWINGS

FIG. 4 is a schematic layout involving in a detail level of what the Kerberos entry point is involved with;

FIG. 5 is a drawing illustrating the actual code of the KSL entry point which appears as the library declaration in the MARC Directive Interface that is used in the library link mechanism. Also shown therein is the actual code of the entry point;

FIG. 6 is an illustration showing the actual code of the entry point in the Kerberos Support Library which has a commonality to the entry point in the MARC, and indicating how all the processing of Kerberos requests coming from MARC is accomplished in the Kerberos Directive Interface;

GLOSSARY OF TERMS

Figure 1:
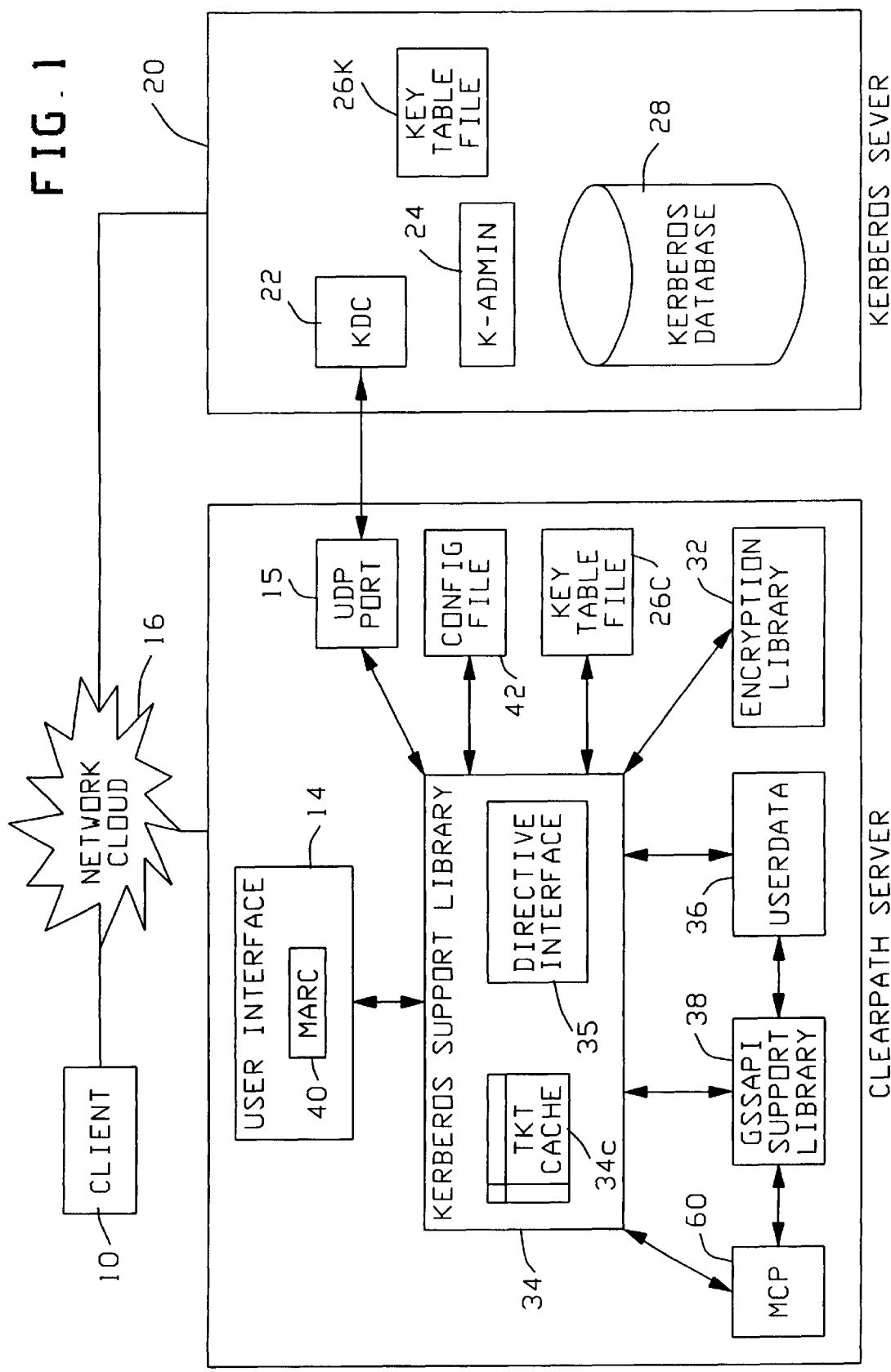
FIG. 1 is a general block diagram showing a client-User connection to a ClearPath Server and a Kerberos Server.

1. UDP (User Datagram Protocol)—This is a communication protocol which is used as one of a number of "standard" methods of communicating information across a network.
   An extension of this is a UDP Port; a communication port which is used for UDP communications.
2. HLCN (Host LAN Connection)—The ClearPath NX HLCN product provides the implementation of NetBIOS and IPX protocols that permit terminal services to the ClearPath NX Server over NetWare.
3. MCS (Message Control System)—Programs (with special privileges) on ClearPath NX systems that control the flow of messages between terminals, application programs, and the operating system (MCP). Reference Unisys "A Series DCALGOL Programming Reference Manual," May 1989/Form 5014574.380 (Release Mark 3.8.0)
4. COMS—(Communications Management System)—is a Unisys message Control System that supports processing for a network on the Unisys ClearPath NX Server. Reference: Unisys A Series Communications Management System (COMS) Operations Guide. May 1989 1154523.380
5. MARC (Menu Assisted Resource Control)—The MARC window provides access to the MARC program. One of the functions of the MARC program is to handle network and session control and provide requested information and system messages for COMS. The MARC window (program) is always in operation in COMS. Reference Unisys "A Series Menu-Assisted Resource Control (MARC)" Unisys Operations Guide, February 1992/Form #8600 0404-100. (Release Mark 4.0.0)
6. GSS-API (Generic Security Service)—Application Program Interface)—This is the draft-standard interface application program used to access available security services generically. The actual security services are provided by underlying mechanisms. Possible implementation choices for mechanisms include, but are not limited to Kerberos, Secure Sockets, DASS. The goal is that applications do not require any knowledge about the underlying mechanism in order to use it. Reference: GSS-API Version 2 on A Series Functional Design Specification 95132/3 Version C. Published Jul. 23, 1996 by Unisys Corp.

6a) DASS—A security mechanism using the X.509 capabilities.

6b) Secure Sockets—A security mechanism that has growing popularity on the Internet.

7. HLCNTS (Host LAN Connection Terminal Service)—ClearPath NX terminal service product predicated on the underlying HLCN product. HLCNTS provides connection based communications between clients using NetWare based IPX/NetBIOS and the ClearPath NX. Reference: Unisys Host LAN Connection Terminal Services (HLCNTS) 0.1.4/Version D, Jun. 26, 1995.

8. Asynchronous Message (Definition #1)—A message (data in display or non-display format) which is generated by a concurrent independent process yet requiring occasional synchronization and cooperation of other process(es). (Definition #2):—A message (data in display or non-display format) which was generated in an environment where asynchronism of processes exists. Reference: "*An Introduction to Operating Systems*" by Harvey M. Deitel (Addison-Wesley Publishing Company) First Edition 1984.

9. Synchronous Message #1—A message (data in display or non-display format) which is generated by a concurrent process dependent upon its own environment. #2—A message (data in display or non-display format) which was generated in an environment where synchronism of a single process exists. Reference: "*An Introduction to Operating Systems*" by Harvey M. Deitel (Addison-Wesley Publishing Company) First Edition 1984.

10. Kerberos Support Library (KSL)—This library provides functions to support the various Kerberos message exchange protocols and a number of User administration functions. It closely interacts with the GSS Library and other system software. Reference: A-EAM Kerberos Support Library—Functional Specification 93187/3 Version C. Published Mar. 6, 1997 by Unisys Corp.

11. Stack Capsulate—A "snapshots" or "outline" of a non-detailed process environment. For explanatory purposes, it is a mid-level overview of the processing environment highlighting events in a sequential order.

12. Dialog No. (Dialog Number—MARC establishes Dialog (s) Numbers on behalf of a client requesting services. A Dialog Number is the internal/external number associated with a client which is accessing (using) MARC.

13. NX MCP Environment—Unisys Corp. sells computers under the name "ClearPath". For explanatory purposes, the architecture is designated as the ClearPath NX. The ClearPath NX is packaged with both MCP environments (this is the Unisys A Series E mode processor) and the "NT" Server side. The NX MCP Environment pertains specifically to the E mode processor side of the architecture exclusive of the NT Server side.

14. Unsolicited Message—A message (data in display or non-display format) which is generated by a concurrent process that is received by a concurrent independent (different) process.

15. Transaction ID i.e., (TRANSACTION ID)—The internal name given to a uniquely generated number passed from MARC to the KSL (Kerberos Support Library) identifying a clients service request. This number will then be attached by the KSL and in turn sent back to MARC such that MARC may route an asynchronous message back to the appropriate client (originator).

16. Networking Host Software—Generalized term for software residing and functioning on the ClearPath NX which provides network communication capability. Software such as the Networking Support Library, Telnet, TCP/IP, HLCN, etc. would be "known" or "thought of" as Networking Host Software.

17. IPX—A communications protocol "Internetwork Packet Exchange".

18. COMS MSG Format—A message consistent with an agreed upon format that COMS (Item #4 of Glossary) recognizes. A message containing a COMS header (information in an agreed upon location and format) and the message portion so that COMS may route the message.

19. Key Distribution Center—Portion of the software residing on the Kerberos Server which processes tasks related to Key(s). A key is a signal code which can be used to access a message which would not ordinarily be accessible.

20. K-Admin—Kerberos Administration/Software on the Kerberos Server responsible for configuration and User administration of the Kerberos Server.

21. DCWRITE—A function construct in DCALGOL used to construct messages and pass messages to an MCS. (Item #3) Reference: A Series DCALGOL Programming Reference Manual form #5014574.380 (May 1989) Page 3–13 and Section 5. Published by Unisys Corporation.

22. NetWare—An operating system developed by Novell, Inc. The NetWare operating system runs in a file server and controls system resources and information processing on the entire network or Internetwork. Reference: "Concepts" Novell NetWare 3.12, July 1993. Part Number 100-001715-001

23. Station Transfer—ClearPath NX terminal service product predicated on an underlying Station Transfer Protocol. Reference: Unisys "A Series Station Transfer Changes for A-EAM," Functional Design Specification 95145/3 Version A, Nov. 2, 1995

24. GSS-API Library—ClearPath NX support library providing services as defined in Item #6 above.

25. User Data—constitutes a miniature data management system that maintains a database called SYSTEM/USERDATAFILE. The database defines valid usercodes and contains various types of data concerning the User population on a particular ClearPath NX Server.

26. Encryption Library—The DES (Data Encryption Standard) Support Library. The DES Encryption Support Library provides the various encryption algorithms which are needed by the Kerberos protocols. According to [RFC1510] any Kerberos implementation must, at a minimum, support the following encryption algorithm:—DES/CBC/MD5 (DES encryption, using cipher block chaining mode with an MD5 checksum).

27. Directive Command—A Directive Command is a feature of MARC which enables a system to create new commands and make them available to MARC Users. The function of a command is defined by writing a library of ALGOL procedures. The DIRECTIVE command is used in MARC to associate a command name with the procedure. Thereafter, Users can use the new command in the same way as they use any other MARC command. Reference Unisys "A-EAM Kerberos Directive Commands," Functional Design, 95057/3 Version B, Aug. 17, 1995.

27a. Directive Interface (DI)—This is the unit which takes advantage of the Directive Command feature. However, when MARC detects that a User request is of a Kerberos nature, MARC hands control over to KSL/DI. The DI parses the Kerberos service requests coming from MARC, verifies the command syntax and calls the appropriate procedures in KSL to process the commands. The advantage of the DI over a Directive command is that there is no need to execute the "Directive Command" to associate a command name (such as KRB) with the procedures, and all of the implementation is centralized in the KSL for case of maintainability.

28. Master Control Program (MCP)—Unisys reference to "Burroughs Large Systems MCP Manual"—Release 3.5; May, 1985/Copyright 1985, Burroughs Corporation, Detroit, Mich. 48232. This involves the operating system for Unisys computer systems.

29. Event—An "Event" provides a means to synchronize simultaneously executing processes. An event can be used either to indicate the completion of an activity (this would be how Kerberos is using it, i.e., on the Kerberos Server; and EVENT is changed to a "Happened" state and the KSL is made aware of this change, in this case the response has been formed) or as an interlock between participating programs over the use of a shared resource. From Unisys "A Series ALGOL Programming Reference Manual Volume 1: Basic Implementation" Release Mark 3.7/July, 1987; Form#1169844.

30. Key Table File:—This is file which contains the secret key for each application Principal Server. These keys are typically generated by the Kerberos Server and brought over to the ClearPath Server to create the Key Table File.

31. Principal_ID:—This is an identifier that identifies a User in a Kerberized environment. It provides a unique name for a Principal.

32. Replay Detection Option:—This is a command to detect any replay attempts done by using stolen credentials. If the replay detection is "on", it provides recipients of the messages with indicators that the message was recognized as a duplicate of a previously-processed message.

33. COMS_HEADER:—This is parameter designated as the COMS Header Array given to the Menu-Assisted Resource Control program (MARC) by CONS. Various User processing items can change or add to information in this array, thus making access to this information desirable or even necessary for certain sites.

34. COMMAND:—This is a parameter which involves an array that contains any text specified after the directive, with the leading and trailing blanks deleted. The first word of this array contains the length of the EBCDIC text that begins in the second word. This text is deliberately kept distinct from the directive itself. In addition, this parameter can be used to return a User-created command.

35. TAG:—This is a parameter which is an array that contains the following specific information about the calling dialog:
   TAG[0]—This contains security information about the calling dialogs, specifically information representing the security state of the calling dialog at the instant of the call as indicated below:
      [03:01] 1 means COMMANDA CAPABLE capability.
      [02:01] 1 means SYSTEM USER capability.
      [01:01] 1 means PRIVILEGED capability.
      [00:01] 1 means COMS CONTROL capability.
   TAG[1]—Contains the length of the language attribute value (string) for this dialog.
   TAG[2]—Contains the value of the language attribute (string). The length of the string is found in TAGE[1].

36. DIRECTIVE:—This parameter is an array that contains the names of the directives entered by the User. This parameter is deliberately separated from the command text. The first word of the array contains the length of the name. The name, in EBCDIC, begins in the second word (the seventh character) of the array.

37. GET_DIALOG_ATTRIBUTE:—This is a parameter which defines a procedure that can be called within the Entry Point Library Procedure in order to obtain additional information about the MARC (calling) dialog that called the Entry Point Library Procedure. A predefined MARC dialog attribute number is passed as the first parameter (ATTNO). If the attribute is within the range of known attributes and information about the attribute of this procedure exists, this procedure returns a result value of "zero," and the current value of the attribute is returned in the array parameter (ATT).

38. RESPONSE_FORMATTER:—This parameter is a formal procedure that is called by the Entry Point Library Procedure, once for each line of the response to be returned to the caller (MARC), for communication to the User. Characters such as carriage return and line feed characters can be embedded within the text to produce multiple lines of output in one call to the RESPONSE_FORMATTER procedure. This procedure has two parameters of its own designated: TEXT_LENGTH and TEXT. The TEXT_LENGTH parameter represents the number of characters of text, and the text itself is contained in the TEXT parameter which is the second parameter. The TEXT_LENGTH parameter must be no more than 255; if this is the case, then only the first 255 characters of the TEXT are used. MARC formats lines exceeding the screen width to avoid truncation of the output text. The procedure returns a value of 1 if MARC determines that formatting is necessary for one of the following reasons:
   1. The message is longer than the screen width.
   2. The message contains characters with values less than an EBCDIC space (hexadecimal 40) that would result in multiple lines of output.

In all other cases the result is 0.

39. SCRATCH:—This parameter is a SCRATCH array for use by the Entry Point Library Procedure. Directive Interface. This parameter minimizes the need for the Kerberos Support Library (KSL) to perform buffer management. This array can be used to format the output of the call to the RESPONSE_FORMATTER procedure. For performance reasons, this array is initialized by the Kerberos Support Library when needed, rather than re-sized or de-allocated.

GLOSSARY

Kerberos Security Administrative Commands

1. All commands are entered by the client with the Kerberos prefix of "KRB".
2. Commands:
   (a) CLOCKSREW: This command allows the ClearPath NX security administrator to set the allowable clock-skew used by the Kerberos protocol to accommodate variations in clocks on remote systems, when verifying a ticket. The default clock-skew value is 300 seconds. (Synchronous).
   (b) DEBUG: The DEBUG command does not require special privilege for a User to inquire on the DEBUG option that is currently being set. DEBUG is used to obtain information about KADMIN request(s), procedure entries and exits, etc. This is used as a diagnostic tool. (Synchronous).

(c) DESTROY: When invoked, the command writes zeros to the specified credentials cache containing the tickets and thereby destroying the tickets. The cache is removed. (Synchronous).

(d) INIT: Before Kerberos can grant tickets for access to the services of other principals in a network, the User must first log in to Kerberos to obtain a set of credentials consisting of a Ticket Granting Ticket (TGT) and a session key (provided the User has not already logged on to Kerberos and had the TGT forwarded to the ClearPath NX Server). On the ClearPath NX Server, the KRB INIT command provides the means for allowing a User to log into Kerberos to obtain the TGT. (Asynchronous).

(e) KeyTab: This command allows an appropriately privileged User to inquire the application principals in the Key Table file on the ClearPath NX Server, but not the values of the keys associated with the application principals. (Synchronous).

(f) LIST: Displays for a User the primary principal and Kerberos tickets held in the credentials cache. (Synchronous).

(g) LOAD: Allows an appropriately privileged User to load new configuration files into memory immediately or wait until the next Kerberos initialization. (By default files are loaded at initialization). (Synchronous).

(h) PASSWORD: Allows the client to change his or her password. (Asynchronous).

(i) PID: Permits the client to inquire on his or her own Principal_ID given his/her clearPath NX Usercode. (Asynchronous).

(j) REALM: Returns the realm name for the local host. (Synchronous).

(l) REPLAY: Allows the appropriately privileged User to inquire, enable, or disable the REPLAY detection option. (synchronous).

DESCRIPTION OF THE PREFERRED EMBODIMENT

The present command functionality methods and system involves the Kerberos realm or domain which often denotes that there are numbers of hosts, servers, and clients connected into a single administrative domain. The general concept for modules which are hosts, servers, or clients, are often designated as "principals". The term "principal" is a term used to denote a uniquely named client or server participating in a network environment. The Kerberos realm or domain, is provided with a Kerberos Server which is a host-server responsible for Kerberos security. The clients, such as client 10 of FIG. 1, are units which may reside in attachment to the network cloud 16 or even within the network cloud. The use of the term "cloud" or the term "network cloud" is a term often proposed by the Novell Corporation, and is used to designate interconnections in a network.

The term "ClearPath" is used to denote a Unisys Corporation system network, wherein different platforms may be connected together, but are also provided with compatible communication protocols and services.

A general overview of a network designated as a Kerberos realm, or Kerberos domain, is shown in FIG. 1. The realm or domain may involve a number of principals such as 10, which may be considered as digital machines, and whereby these principals involve connections to clients or servers that are participating in the domain which is under the control of a particular Kerberos Server, such as Kerberos Server 20 of FIG. 1.

Thus as seen in FIG. 1, a client 10 may be connected through network cloud 16 to both a ClearPath Server 13, and also a Kerberos Server 20. In the ClearPath Server 13, the User Datagram Port (UDP) 15 can be used to connect to the principal or client 10 via the network cloud 16. The network cloud 16 is also connected to the Kerberos Server 20 and the UDP (User Datagram Port) 15 of the ClearPath Server 13.

A "realm" or a "domain" may denote a number of host servers or clients and principals involved in a single administrative domain, often designated as a Kerberos domain. The Kerberos realm can be considered as a term for modules participating in a Kerberos domain. Further, there can also occur a number of different realms or domains which can be interconnected, but which involve another level of complexity.

In FIG. 1, the ClearPath Server 13 is shown with a number of its basic functional elements. These include the User Interface 14 which includes the Menu-Assisted Resource Control Program 40 (MARC). This User Interface 14 connects to the Kerberos Support Library 34 which has a Directive Interface 35 and a Ticket Cache 34c. Connected to the Kerberos Support Library 34 is a UDP Port 15, a Configuration File 42, a Key Table File 26C, in addition to other interconnections involving the Kerberos Support Library 34 which include a Master Control Program 60, the GSSAPI Support Library 38, the UserData Module 36 and the Encryption Library 32. The Master Control Program (MCP) 60 interconnects to the GSSAPI Support Library (Generic Security Service-Application Program Interface) 38 which interconnects to the UserData Module 36.

Also connected to the Network Cloud 16, which interfaces to Client 10, is the Kerberos Server 20. The Kerberos Server 20 is seen to include a Key Distribution Center KDC 22, a Key Table File 26K, a Kerberos Administrative Module 24 and a Kerberos Database 28. The Key Distribution Center 22 is seen interconnecting to the UDP Port 15 of the ClearPath Server 13.

As seen in FIG. 1, the User Interface 14 and its Menu-Assisted Resource Control Program (MARC) 40 communicates with a Kerberos Support Library (KSL) 34 which contains the Directive Interface (DI) Module where DI is the interface between MARC 40 and KSL 34.

The Directive Interface 35 is the interface between the Menu-Assisted Resource Control 40 and the Kerberos Support Library 34 whereby the Directive Interface 35 parses the Kerberos Service Requests coming from MARC 40, then verifies the command syntax and then calls the appropriate procedures in the Kerberos Support Library (KSL) 34 to process the commands.

All network communication to the Key Distribution Center 22 (KDC) is through the Universal Data Port (UDP) Port File 15 which has a port number designated "88." The UDP Port File Interface is an internal interface available only for system libraries.

The Kerberos Server 20 (KS) is a third party Kerberos Server running on other platforms such as UNIX and the Kerberos Server 20 will include the following components:

i) A KDC (Key Distribution Center) 22 involving software on the Kerberos Server which processes tasks related to Keys;

ii) K-ADMIN 24 (Kerberos Administration Server):— This is a protocol on the Kerberos Server responsible for configuration and user administration;

iii) Kerberos Database 28:—This is a repository for user information;

iv) Key Table File 26K:—This is a file which contains the secret key for each application principal server. These keys are typically generated by the Kerberos Server 20 and brought over to the ClearPath Server 13 to create the Key Table File 26C.

As seen in FIG. 1, the ClearPath Server 13 has a number of elements which can be functionally described as follows:

a) The User Interface 14:—This interface uses the Menu-Assisted Resource Control Program 40 (MARC) as a standard user interface in order to make a Kerberos Service Request.

b) The Kerberos Directive Interface 35:—This is a module within the Kerberos Support Library 34 which provides the syntactic verification of input from MARC 40, then requests information and routes the response back to MARC 40 to be displayed to the user once the processing is done.

c) Encryption Library 32:—This is software that provides algorithms for encryption and decryption.

d) UserData Module 36:—This is a file that provides the mapping between the UserCode and the Principal_ID. UserCode is an identifier that identifies a User on the Unisys ClearPath system.

e) Generic Security Service Application Programming Interface (GSSAPI) Support Library 38:—This application program interface is used to facilitate the development of User written applications that desire to use Kerberos for authentication and encryption.

f) Master Control Program 60 (MCP):—This is the operating system software that provides, among other things, the User privilege information.

g) Key Table File 26C:—This is a file (in ClearPath Server 13) that contains the secret key for each application principal server which is a Principal_ID to identify an "application name", as opposed to the Principal_ID which identifies a Client-User. These keys are typically generated by the Kerberos Server 20 and brought over to the ClearPath Server 13 to create the Key Table File 26C.

h) Configuration File 42:—The Kerberos operating configuration is dependent upon one or more configuration files which reside in all the server and client systems in the network. The number of files will depend upon the file format used. These files contain configuration information describing the default Kerberos Realm and the location of the Kerberos Key Distribution Centers (KDCs) for the known realms.

i) UDP Port (User Datagram Protocol) 15:—All the network communications to the KDC 22 are done through the UDP Port File 15 Interface using a designated port number as number "88." The UDP Port File Interface 15 is an internal interface which is available only for system libraries.

Now referring to the functional operation of FIG. 1, the Menu-Assisted Resource Control Program 40 (MARC) provides a User interface that enables a User to make a Kerberos Service Request. The Kerberos Support Library 34 (written in NEWP as a system library) implements the operation of the Kerberos functionality. NEWP is a programming language. The Kerberos Support Library implements the necessary parts of the Kerberos protocol designated K-Admin 24 (Kerberos Administration Server) client protocol and other relevant data structures. The Kerberos Support Library interfaces with the GSS-API Support Library 38 so that any applications can make use of the GSS-API calls in order to initiate and accept the security context, and to exchange authenticated and confidential data. The KSL Library includes the routines to communicate with the Kerberos Server 20 through the UDP 15.

In FIG. 1, the Directive Interface 35 (DI) Module is an interface between MARC 40 and the Kerberos Support Library 34. The Directive Interface parses the Kerberos Service Requests coming from MARC 40 and then verifies the command syntax and then calls the necessary procedures in the Kerberos Server Library 34 in order to process the commands. The GSSAPI Support Library 38 provides the call back routine that can be used by the Kerberos Support Library 34 in order to return tokens and other responses. The Encryption Library 32 provides the routines for encryption/decryption in addition to checksum computation.

The Master Control Program 60 (MCP) will restrict access to the Key Table 26C only to the Kerberos Support Library 34. The MCP provides memory management changes to prevent "secure" data from being dumped during program dumps. The MCP also facilitates asynchronous massage traffic from the Kerberos Support Library 34 to the MCP 60.

The UserData file 36 provides the mapping between the ClearPath UserCode and the Kerberos Principal_ID.

The Key Table File 26K in the Kerberos Server 20 contains the secret key for each application principal server. These keys are generated by the Kerberos Server 20 and brought to the ClearPath Server to create the Key Table File 26C.

The Configuration File 42 of FIG. 1 contains the configuration information which describes the Default Kerberos Realm and the location of the Kerberos Key Distribution Centers (KDCs) for the known realms. The UDP Port File Interface 15 is an internal interface available only for system libraries. All the network communications to the Key Distribution Center 22 is done through the UDP Port File 15 Interface using the port number designated "88."

Regarding FIG. 1, there is involved a Client 10 who is operating on the Unisys ClearPath system. The client-user chooses the program MRC 40 to make a Kerberos service request.

The Kerberos Support Library (KSL) 34 will eventually receive the Kerberos Service Request through the Kerberos Directive Interface 35 (KDI). Depending upon the type of service request, the Kerberos Support Library (KSL) 34 will then contact the required modules and data in order to retrieve the response and return the response to the client-User in the network.

Figure 2:
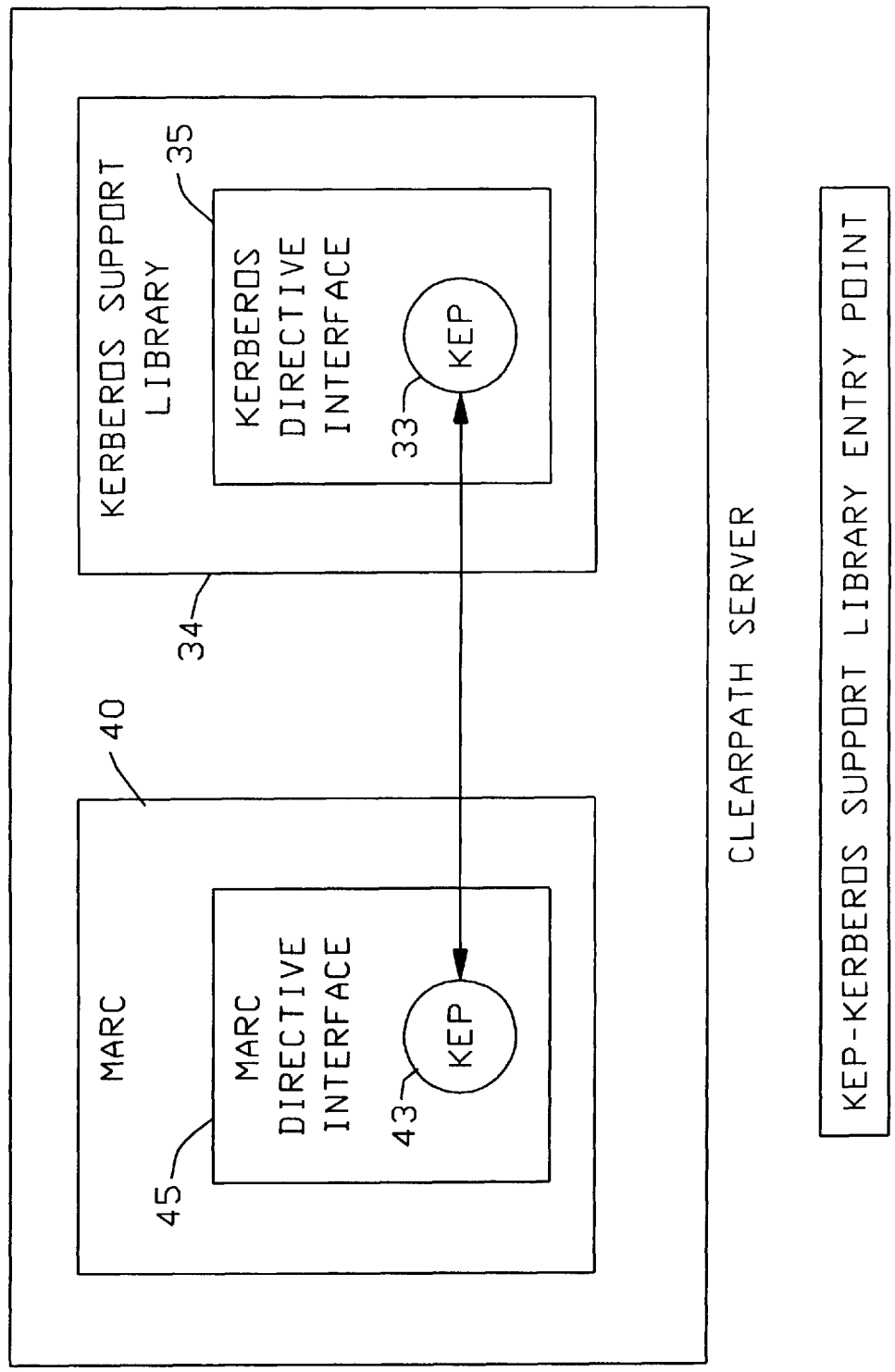
FIG. 2 is a schematic drawing showing a high-level detail of the Menu-Assisted Resource Control program in calling the Kerberos Support Library (KSL) entry point from within MARC into the Kerberos Support Library (KSL) via a library link mechanism.

FIG. 2 is an schematic illustration showing the high-level detail of the Menu-Assisted Resource Control program calling the Kerberos Support Library (KSL) entry point from within the NAC Directive Interface 45 and into the Kerberos Support Library 34 via the Kerberos Key Entry Point 33 in the Kerberos Directive Interface 35.

Functionally, (i) a User is connected onto the ClearPath system; (ii) the User makes a request from MARC; (iii) here, the Kerberos Directive Interface 35 (KDI) is called for service from the Menu-Assisted Resource Control 40 (MARC); (iv) once the Kerberos Support Library 35 (KSL) receives the request, it will then either: (a) generate a response; (b) contact the Kerberos Server to get the response; (c) contact the Kerberos Server and the GSSAPI Support Library 38 to get the response. (v) Contact the User Data file 36 in order to get the response; (vi) return the response to MARC.

Figure 3:
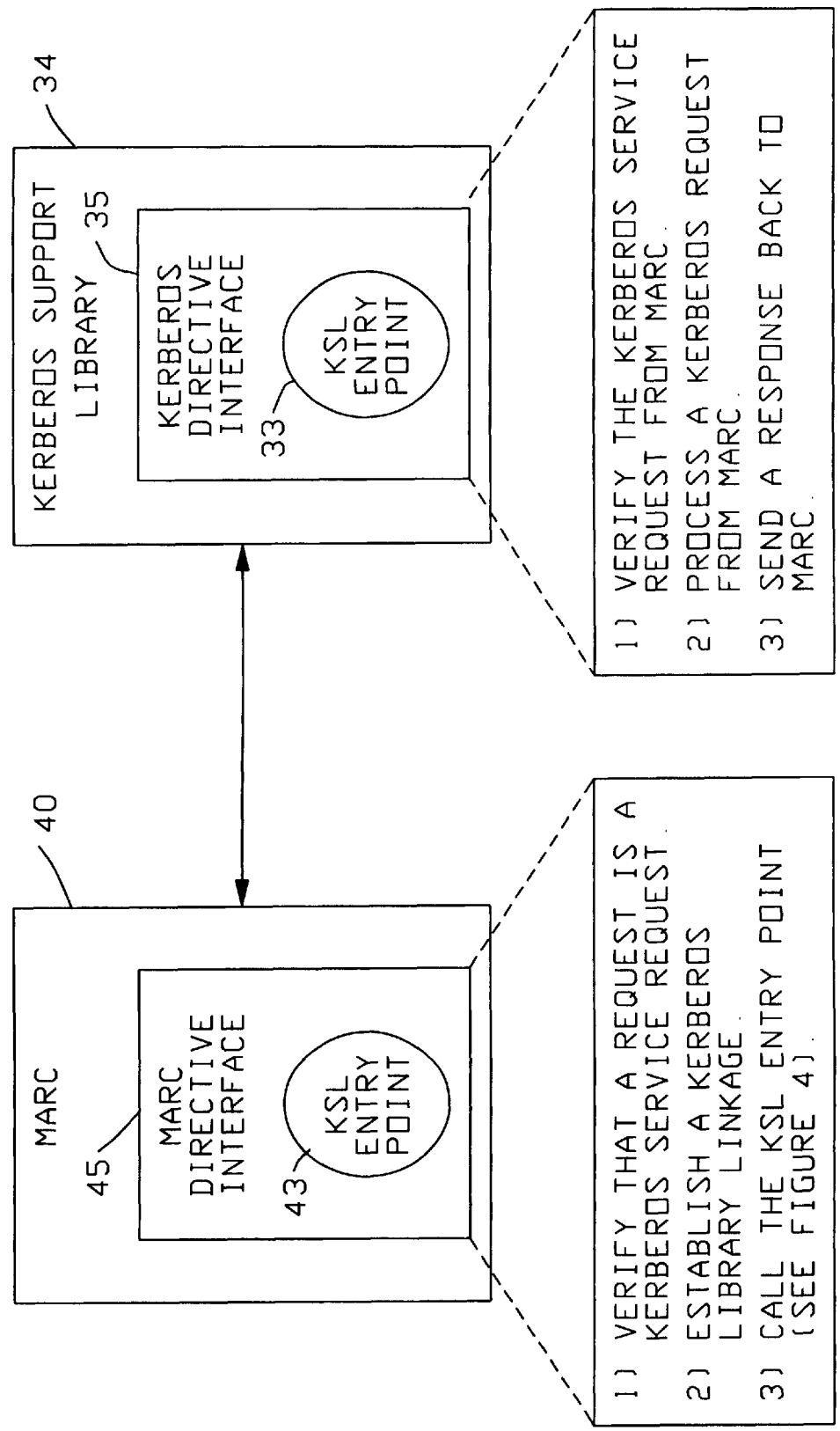
FIG. 3 is a schematic drawing showing a low-level detail of the Directive Interface of the Menu-Assisted Resource Control program (MARC) which Directive Interface takes a User request and verifies whether it is a Kerberos request.

FIG. 3 is a schematic illustration showing the low-level detail of the MARC Directive Interface 45 which takes a User request and verifies whether it is a Kerberos request. If it is a Kerberos Service Request, the MARC Directive Interface 45 establishes a link to the Kerberos Support Library 34 via a library link mechanism. If the linkage is successful, MARC calls the Kerberos-KSL Entry Point 43 from MARC and passes this request on to the Kerberos Support Library 34.

On the Kerberos Support Library side 34 and assuming that MARC passes the service request to the Kerberos Support Library successfully, the Kerberos Directive Interface 35 then receives the request, processes the request and sends a response back to MARC to be displayed to the User.

Figure 4:
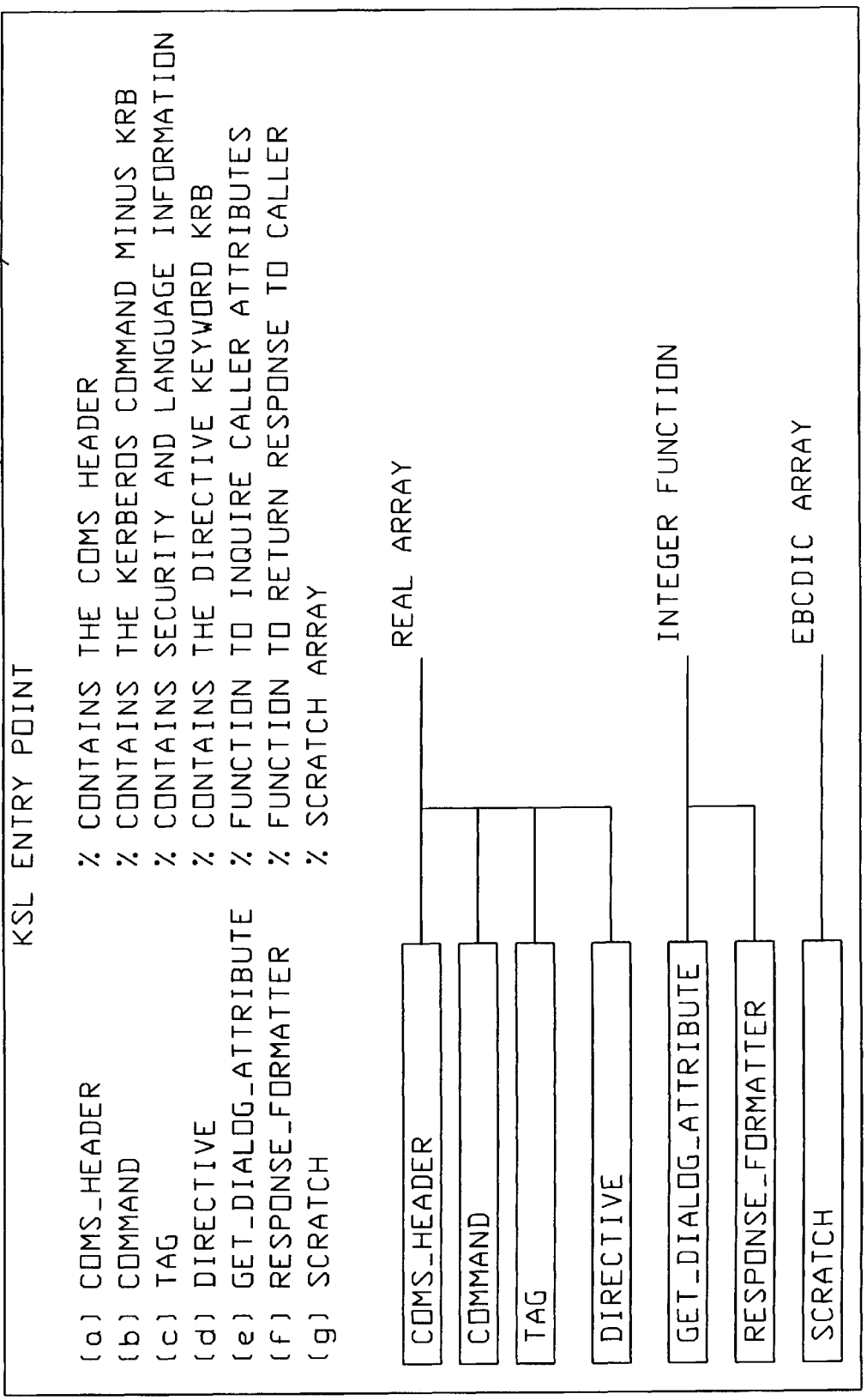

FIG. 4 is a schematic detail of what the Key Entry Point (43,33) looks like. This entry point is the same both in MARC 40 where it appears as Item 43 and likewise in the Kerberos Support Library where it appears as the Kerberos Key Entry Point 33. This is a common entry point on both ends of MARC 40 and the Kerberos Support Library (KSL) 34 which must match up in order to allow MARC and KSL to communicate. This entry point is a function call that is seen to have seven "parameters." Four of these parameters are real arrays, two of these are function calls that allow the Kerberos Support Library 34 to call back to MARC 40 in order to request additional information, plus one EBCDIC array. These parameters have been defined and discussed in the Glossary at item numbers 33, 34, 35, 36, 37, 38, and 39.

Here, the Menu-Assisted Resource Control Program 40 uses its KSL entry point 43 to expound a request to the Kerberos Support Library 34 and to receive a reply. The Kerberos Support Library entry point 43 operates to (i) serve as a common point of entry between MARC and KSL; (ii) relay a User's request; (iii) provide a means for the KSL to request more information from MARC; (iv) provides a mechanism for KSL to route a response back to the User.

The request from MARC 40 is transferred to the KSL for processing through the entry point 43 in the Directive Interface 35 which contains the entry point which has parameters (a) (b) (c) (d) (e) (f) (g) of FIG. 4 as previously shown for the entry point 43.

FIG. 5 is an illustrative drawing showing the actual code which was outlined in FIG. 4. FIG. 5 shows the library declaration in the MARC Directive Interface 45 that is used in the library link mechanism. Additionally, FIG. 5 shows the actual code of the entry point.

FIG. 6 is an illustration showing the actual code of the entry point in the Kerberos Support Library which is part of the Kerberos Directive Interface 35 in FIG. 3. As can be seen, the entry point for the KSL entry point is the same duplication in order to form a commonality on both ends of the MARC Directive Interface and the KSL Interface. All of the processing of the Kerberos Requests coming from MARC is actually done in the Kerberos Directive Interface of FIG. 6.

Figure 7:
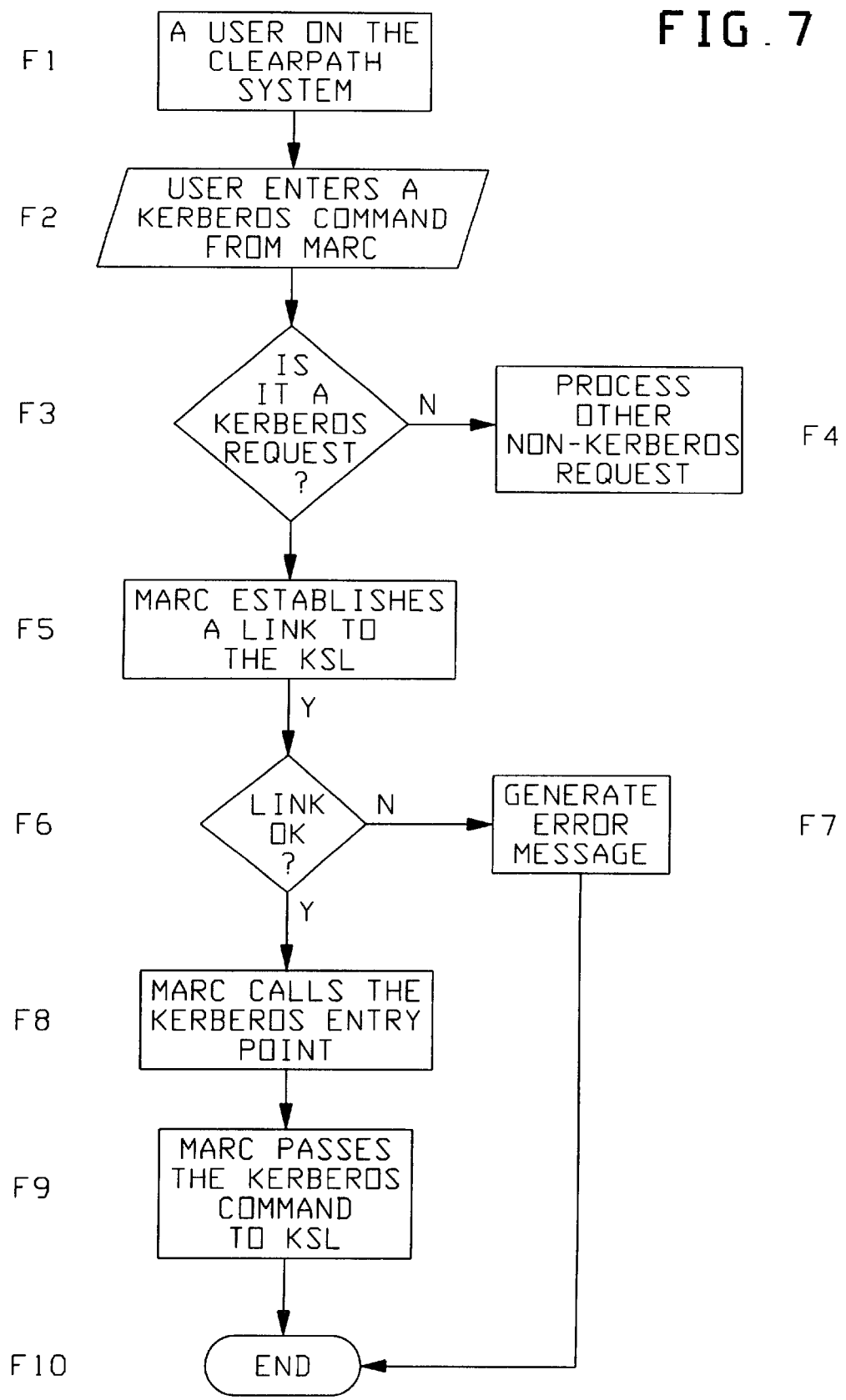
FIG. 7 is a flow chart illustrating how the backend interface functions from the moment a User enters a Kerberos Service Request from MARC to the moment that MARC passes this request on to the Kerberos Support Library (KSL)

FIG. 7 is a flow chart illustrating how the back end interface works from the moment a User enters a Kerberos Service Request from MARC to the moment that MARC passes the request on to the Kerberos Support Library (KSL). As seen in FIG. 7 at step F1, a User logs on to the ClearPath system. At step F2, the User enters a Kerberos command from the Menu-Assisted Resource Control program. At step F3, a decision point is reached as to whether or not this is a Kerberos Request. If the answer is "No," then at step F4, the system will process other non-Kerberos Requests.

If the answer at F3 is "Yes," then the procedure steps to step F5 where MARC establishes a linkage to the Kerberos Support Library. At steps F6, a decision branch is reached to check whether the link is OK or not. If not, the system goes to step F7 in order to generate an error message.

At step F6, if the link is OK (Yes), then the procedure goes to step F8 wherein MARC calls the Kerberos Entry Point 43.

Then at step F9, the MARC passes the Kerberos command to the Kerberos Support Library at which time at step F10, the cycle of MARC passing the Kerberos command to the Kerberos Support Library is finished.

Figure 8:
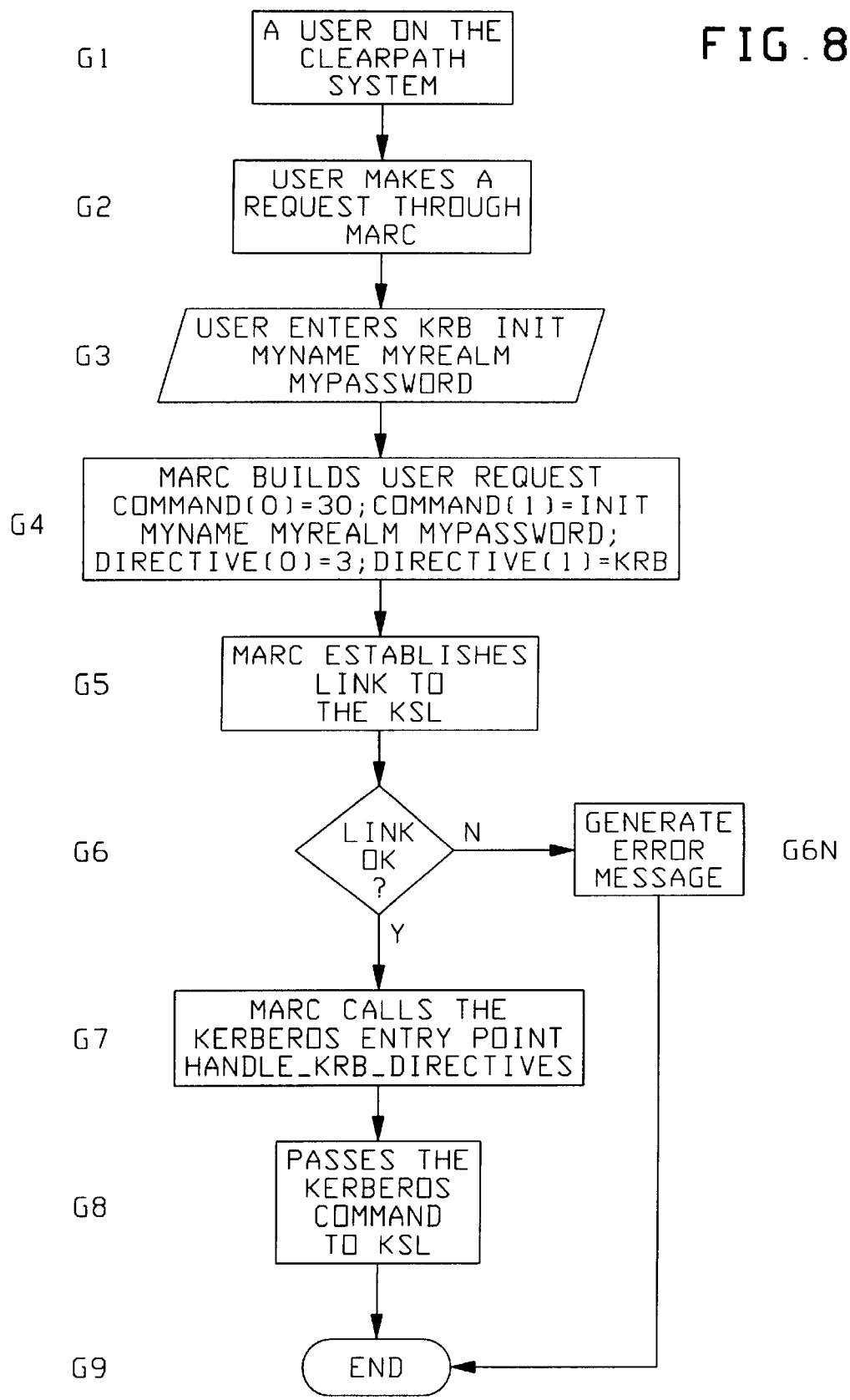
FIG. 8 is a flow chart illustrating a concrete example of a specific User request (log-on request) and illustrates how MARC organizes the request and then passes it on to the Kerberos Support Library (KSL)

FIG. 8 is a flow chart indicating a concrete example of a specific User request. FIG. 8 illustrates how MARC organizes the request and passes it on to the Kerberos Support Library 34.

In FIG. 8 at step G1, a User logs on to the ClearPath system. At G2, he makes a request through the Menu-Assisted Resource Control program, MARC 40. At the next step which is step G3, the User enters certain commands such as KRB INIT and the other commands shown which can be defined as seen in the Glossary of the Kerberos Security Administrative Commands.

At step G4, MARC builds a User Request as illustrated in the commands, names and directives shown in step G4.

At step G5, MARC establishes linkage to the Kerberos Support Library.

At step G6, a decision block is reached to determine whether the link is OK. If the link is not OK (No), then step G6N will generate an error message.

If at step G6, it is found that the link is OK (Yes), then at step G7, MARC calls the Kerberos Entry Point named HANDLE_KRB_DIRECTIVES and transfers the processing of the request to it.

At step G8, MARC passes the Kerberos command to the Kerberos Support Library 34 at which time at step G9, this finishes the cycle for how MMC organizes the request and passes it on to the Kerberos Support Library.

Figure 9:
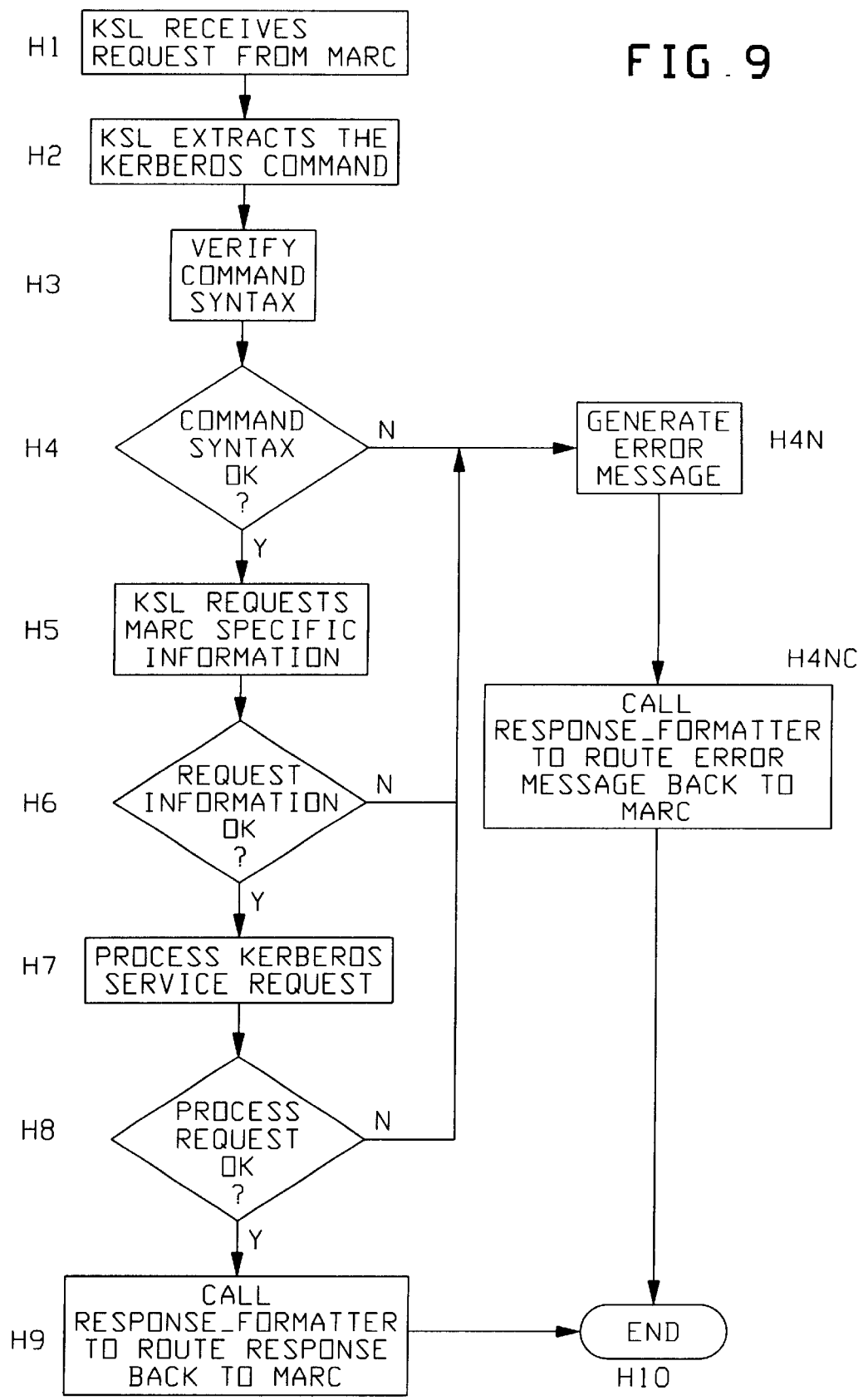
FIG. 9 is a flow chart illustrating how the backend interface functions from the moment the Kerberos Support Library (KSL) receives the service request from the Menu-Assisted Resource Control program (MARC)

FIG. 9 is a flow chart illustrating how the flow of the back end interface works from the moment the Kerberos Support Library (KSL) receives the service request from the MARC program. This illustrates how the request is processed through the moment the response is sent back to MARC to be displayed to the User.

In FIG. 9 at step H1, the Kerberos Support Library is seen to receive the request from the MARC program. Then at step H2, the Kerberos Support Library extracts the Kerberos command.

At step H3, the Kerberos Support Library will verify the command syntax after which at step H4, a decision block is reached to check whether the command syntax is OK or not. If not (No), then at step H4N, the Kerberos Support Library will generate an error message after which at step H4NC, a callback will be made to the RESPONSE_FORMATTER to route the error message back to MARC.

At step H4, if the command syntax is OK (Yes), then the procedure moves to step H5 where the Kerberos Support Library requests specific information from MARC.

Then at step H6, a decision block seeks to determine whether the request for information is OK or not. If not, then the procedure goes to step H4N to generate an error message.

At step H6, if the request for information is OK (Yes), then at step H7, the Kerberos Support Library will process the Kerberos Service Request after which at step H8, a decisional block is reached to determine whether the process request was OK or not. If not, then an error message is generated (No).

At step H8, if the process request is OK (Yes), then step H9 is implemented in order to call the RESPONSE_FORMTTER which will root the response back to MARC after which at step H10, this cycle is completed.

Figure 10:
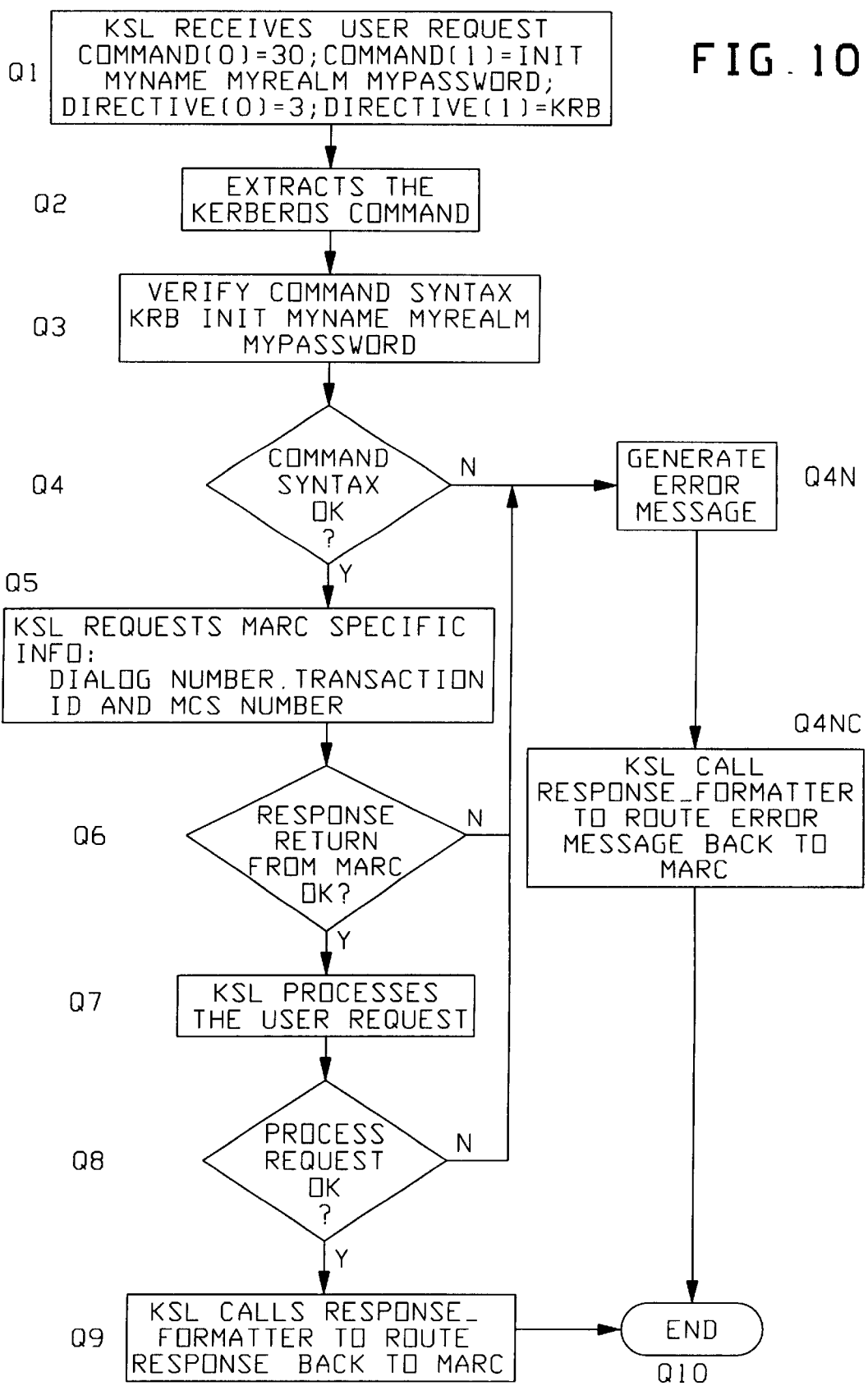
FIG. 10 is a flow chart illustrating a concrete example of a specific User request (log-on request) to illustrate how the Kerberos Support Library (KSL) receives the request from MARC, and extracts the request from MARC after which it sends a response back to MARC to be displayed to the User.

FIG. 10 is a flow chart illustrating an example of the specific User Recuest, that is to say a log-on request. It illustrates how the Kerberos Support Library (KSL) receives a recuest from MARC and how it extracts the request which came from MARC. At the end of the processing steps, it then illustrates how it sends a response back to MARC to be displayed to the User.

In FIG. 10 at step Q1, it is seen that the Kerberos Support Library receives the User Request, verifies the Rerberos Logon command, the name, the realm, the password and the directives commands for Kerberos.

At step Q2, the Kerberos Support Library extracts the Kerberos command.

At step Q3, the Kerberos Support Library verifies the Kerberos Logon command syntax for initiating Kerberos and verifying the name, the realm and the password.

At step Q4, a decision block is utilized in order to determine whether the command syntax is OK or not. If not, the procedure moves to step Q4N in order to generate an error message which is then passed on step Q4NC to the Kerberos Support Library which calls the RESPONSE_FORMATTER to route the error message back to MARC.

At step Q4, if the command's syntax is OK (Yes), then at step Q5, the Kerberos Support Library requests MARC for specific information, that is to say, the dialog number, the transaction ID and the MCS (Message Communication System) number.

At step Q6, a decision block is used to determine whether the response returned from MARC is OK or not. If not, an error message is generated. If the response return is good (Yes), then at step Q7, the Kerberos Support Library processes the User Request.

At step Q8, a decision block is utilized to determine whether the process request was OK or not. If the process is OK (Yes), then the procedure moves to step Q9 where the Kerberos Support Library calls RESPONSE_FORMATTER to route the response back to MRC to be displayed to the User. At step Q10, this ends this sequence on the KSL end.

Described herein has been a method and system wherein a User on the ClearPath server now has a number of new Kerberos functionalities available on MARC, and a standard User interface on the ClearPath server. The Kerberos functionality is made to have the "same look and feel" as the existing functionality in MARC. Hence, the new Kerberos command syntax should be transparent to the Users using MARC to make a request. What is behind the scene is that MARC can now call the KSL to process the Kerberos User request by calling a common entry point existing in both MARC and KSL. Once the KSL is done processing a request coming from MARC, it routes the response back to MARC to be displayed to the User.

While a preferred embodiment of the above method and system has been described herein, it should be understood that other possible arrangements and formats may be utilized to accomplish the functions of the above-described invention, but whose functions would be encompassed by the defining elements of the attached claims herein.

What is claimed is:

1. In a Kerberos domain network wherein multiple Client Users have client terminals which communicate with a Kerberos Server and with a client server having a Kerberos Support Library, said client server utilizing a Menu-Assisted Resource Control Program for communication to said Kerberos Support Library, a method for seamlessly initiating a Kerberos Command to said Kerberos Support Library and receiving a response back to said Client User, comprising the steps of:

(a) initiating, by said Client-User, of a Kerberos command to said Menu-Assisted Resource Control Program and its Directive Interface;

(b) linking, by said Menu-Assisted Resource Control Directives Interface to a corresponding Directive Interface in said Kerberos Support Library;

(c) generating a response by said Directive Interface of said Kerberos Support Library for conveyance to said Directive Interface of said Menu-Assisted Resource Control Directives Interface;

(d) transmitting said response via said Menu-Assisted Resource Control Program as a response to said Client User's request for utilization of a Kerberos command.

2. The method of claim 1, which includes the steps of:

(i) receiving by said Menu-Assisted Resource Control Program of said Kerberos Command and conveying it to a MARC Entry Point in a MARC Directives Interface;

(ii) linking by said Key Entry Point of said MARC Directives Interface, over to a Key Entry Point of said Directives Interface of said Kerberos Support Library;

(iii) generating, by said Kerberos Support Library of a response to said Kerberos command;

(iv) transmitting said response via said Key Entry Point of said Kerberos Support Library Directives Interface over to said Key Entry Point of said MARC Directives Interface;

(v) conveying said response, by said MARC Key Entry Point Directives Interface to said Menu-Assisted Resource Control Program;

(vi) transmitting by said Menu-Assisted Resource Control Program, of said response back to said Client User.

3. A method for generating a response to a Client-User's Kerberos command through use of a Menu-Assisted Resource Control Program in a client server attached to a Kerberos domain, said method comprising the steps of:

(a) utilizing by a Client User, of a Menu-Assisted Resource Control Program;

(b) initiating a Kerberos command by said Client User to said Menu-Assisted Resource Control Program;

(c) building a set of parameters by said Menu-Assisted Resource Control Program for subsequent communication to a Kerberos Support Library;

(d) linking, by said Menu-Assisted Resource Control Program, to said Kerberos Support Library via Entry Point;

(e) calling, by said Menu-Assisted Resource Control Program of said Entry Point of said Kerberos Support Library;

(f) developing a response to said Kerberos command by said Kerberos Support Library for conveyance to said Menu-Assisted Resource Control Program;

(g) transmitting, by said Menu-Assisted Resource Control Program, of the Kerberos command response to the said Client-User.

4. The method of claim 3, wherein step (d) includes the step of:

(d1) checking to see that the link between MARC and the Kerberos Support Library has been properly established;

(d2) generating an error message, if said link has not been properly established.

5. A method for utilizing a client server having a Menu-Assisted Resource Control Program (MARC) operating in communication with a Kerberos Support Library (KSL) in a Kerberos domain having a Kerberos Server, wherein a Client-User can seamlessly access and get a response to a Kerberos command, said method comprising the steps of:

(a) logging onto said client server by a Client-User;

(b) utilizing, by said Client-User, of said Menu-Assisted Resource Control Program as a User Interface;

(c) entering of a Kerberos command by said Client User;

(d) building, by said Menu-Assisted Resource Control Program, (MARC) of said Client-User request with specific parameters to communicate from a Directive Interface of said Menu-Assisted Resource Control Program to a Directive Interface of said Kerberos Support Library;

(e) developing a communication link between said Menu-Assisted Resource Control Program and said Kerberos Support Library, via a Kerberos Entry Point of the Directive Interface of said Kerberos Support Library;

(f) checking said link between said Menu-Assisted Resource Control Program and said Kerberos Support Library to verify a properly direct linkage;

(g) calling, by said Menu-Assisted Resource Control Program, of said Kerberos Entry Point which processes the Kerberos command;

(h) passing, by said Kerberos Directive Interface of the initiated Kerberos command to said Kerberos Support Library.

6. The method of claim 5, which includes the steps of:

(i) receiving, by said Kerberos Support Library of a User request and said specific parameters;

(j) extracting, by said Kerberos Support Library of the Kerberos command, and verifying the command syntax;

(k) using a call back function designated GET_DIALOG_ATTRIBUTE in order to get a dialog number, transaction ID and a message communication system number;

(l) checking to verify that the required information is properly assembled;

(m) processing, by said Kerberos Support Library of the User request and verifying that the process has been completed properly;

(n) calling, by said Kerberos Support Library of said call back function designated RESPONSE_FORMATTER program in order to route the response back to the Menu-Assisted Resource Control Program (MARC);

(o) transmitting by said MARC program of the developed KSL response to said client-User.

7. In a network wherein a Client-User is connected to a Kerberos server and a specialized client-server which utilizes a Menu-Assisted Resource Control Program, a system for seamlessly transmitting a Kerberos command, from said Client User, to said Menu-Assisted Resource Control Program and receiving a Kerberos Support Library response back through said Menu-Assisted Resource Control Program, said system comprising:

(a) a Kerberos Server means communicating with said Client-User and said specialized client-server;

(b) said specialized client-server holding a Kerberos Support Library which links to said Menu-Assisted Resource Control Program;

(c) means, by said Client-User, to seamlessly initiate a Kerberos command to said Kerberos Support Library via said Menu-Assisted Resource Control Program;

(d) means for transmitting a response from said Kerberos Support Library through said Menu-Assisted Resource Control Program to said Client User.

8. The system of claim 7 wherein said Kerberos Server means includes:

(a) a Kerberos database;

(b) a Key Distribution Center;

(c) a Key Table File;

(d) a Key Administration Program.

9. The system of claim 7 where said specialized client-server includes:

(i) a first Directives Interface in said Menu-Assisted Resource Control Program;

(ii) a Kerberos Support Library having a second Directives Interface which is linked with said first Directives Interface of said Menu-Assisted Resource Control Program;

(iii) means, using a first Entry Point of said Menu-Assisted Resource Control Directives Interface to communicate with a second Entry Point in said Kerberos Support Library Directives Interface;

(iv) wherein said Menu-Assisted Resource Control first Entry Point and said Kerberos Support Library Second Entry Point are duplicates of each other and provide procedure calls into their respective library of codes.

* * * * *